United States Patent [19]

Sekmakas et al.

[11] 4,116,901

[45] Sep. 26, 1978

[54] LOW TEMPERATURE CURING ESTER COPOLYMERS-PHENOLIC CONDENSATES

[75] Inventors: Kazys Sekmakas, Chicago; Raj Shah, Schaumburg, both of Ill.

[73] Assignee: DeSoto, Inc., Des Plaines, Ill.

[21] Appl. No.: 860,907

[22] Filed: Dec. 15, 1977

[51] Int. Cl.$^2$ ................................................ C09D 3/76
[52] U.S. Cl. ........................... 260/19 UA; 260/19 EP; 260/23 EP
[58] Field of Search .......... 260/19 UA, 19 EP, 23 EP

[56] References Cited

U.S. PATENT DOCUMENTS

| | | | |
|---|---|---|---|
| 2,877,195 | 3/1959 | McNabb | 260/23 EP |
| 3,245,925 | 4/1966 | Watson | 260/19 EP |
| 3,567,668 | 3/1971 | Güldenpfennig | 260/19 EP |
| 3,661,818 | 5/1972 | Güldenpfening | 260/19 EP |
| 3,663,484 | 5/1972 | Broecker | 260/19 EP |
| 3,663,487 | 5/1972 | Broecker | 260/19 EP |
| 3,847,851 | 11/1974 | Tugukuni et al. | 260/23 EP |
| 3,856,725 | 12/1974 | Montesissa et al. | 260/19 UA |
| 3,954,688 | 5/1976 | Hazan et al. | 260/19 EP |

*Primary Examiner*—Ronald W. Griffin
*Attorney, Agent, or Firm*—Dressler, Goldsmith, Clement, Gordon & Shore, Ltd.

[57] ABSTRACT

Low temperature curing aqueous coatings are provided in which the resin solids are constituted by an epoxy ester of a resinous polyepoxide with at least about 0.2 mole of monocarboxylic acid containing conjugated unsaturation per epoxy equivalent in the polyepoxide and at least about 0.5 mole of monocarboxylic acid containing nonterminal nonconjugated unsaturation per epoxy equivalent in the polyepoxide. This epoxy ester is substantially free of epoxy groups and is copolymerized in solvent solution with monoethylenic monomers containing terminal unsaturation, including carboxyl-functional monomers and preferably also monomer providing a primary hydroxy group, and then precondensed with a phenolic resin to provide a non-gelled, solvent-soluble copolymer-phenolic condensate having carboxyl-functionality and residual ethylenic unsaturation. The carboxyl-functionality of the copolymer allows it to be dispersed in water with the aid of a base, and the residual ethylenic unsaturation enables an oxidative cure to supplement the cure with the phenolic resin and this minimizes curing temperature at the same time that the cure is maximized to provide better salt spray and detergent resistance than would otherwise be obtainable.

19 Claims, No Drawings

LOW TEMPERATURE CURING ESTER COPOLYMERS-PHENOLIC CONDENSATES

This application is directed to an improvement over the contribution disclosed in our copending application Ser. No. 844,021 filed Oct. 21, 1977.

The present invention relates to aqueous coating compositions based on epoxy ester copolymers which contain residual unsaturation, to enable an oxidative cure, and which also include condensed phenolic resin so that curing temperature is minimized at the same time that salt spray and detergent resistance is improved.

In accordance with this invention, a resinous polyepoxide, and preferably a bisphenol-based polyepoxide having a 1,2-epoxy equivalency of from about 1.4 to about 2.0, is reacted with two different ethylenically unsaturated monocarboxylic acids to substantially consume the epoxy functionality. One of the monocarboxylic acids contains conjugated ethylenic unsaturation, and the other monocarboxylic acid contains nonterminal nonconjugated ethylenic unsaturation. The polyepoxide can be reacted with the acids separately or with a mixture of the acids. The resulting unsaturated epoxy ester thus contains two different types of unsaturated side chains, and this epoxy ester is copolymerized in organic solvent solution, the solvent being preferably water miscible, with monoethylenically unsaturated monomer containing terminal ethylenic unsaturation and including a carboxyl-functional monomer, and the copolymer is then precondensed with a phenolic resin. This forms a normally solid nongelled organic solvent soluble copolymer-phenolic condensate while leaving the nonterminal nonconjugated unsaturation unconsumed in a copolymer containing carboxyl groups so as to be dispersible in water by at least partial neutralization with a volatile base to form an aqueous coating solution. This provides aqueous coatings which will dry and cure in air at relatively low temperature. When a portion of the described monomers provides a primary hydroxyl group, the coatings thermoset at even lower temperatures.

The retained unsaturation in the copolymer has the capacity to combine with atmospheric oxygen so that the cure with the precondensed phenolic resin is supplemented by an oxidative cure which lowers curing temperature and provides a more salt spray and detergent resistant coating. When the copolymer with its retained unsaturation includes monomer providing primary hydroxyl groups, the cure with the phenolic resin is further enhanced, and this further lowers the curing temperature.

The low temperature curing aqueous coatings are unusual because the aminoplast cure of hydroxy functional resins normally requires a curing temperature of from 325° F. to 400° F. to produce a good corrosion-resistant cure. In the absence of precondensation with phenolic resin, and as pointed out in our prior application, Ser. No. 749,968 filed Dec. 13, 1976, now abandoned, the cure only requires baking temperatures in the range of 240° F. to 290° F. when primary hydroxy groups are present and when an oxidative cure is present. In this invention, the curing temperature is somewhat further lowered in comparison with the same copolymer (absent precondensation with the phenolic resin) and the salt spary and detergent resistance properties are improved.

It is also possible to replace the unsaturated monocarboxylic acids with corresponding monoalcohols and to proceed by etherification instead of by esterification. However, the unsaturated acids are more available and the esterification reaction proceeds more efficiently, so the unsaturated acids are preferred to the corresponding unsaturated alcohols.

The preferred starting materials are diepoxides or include diepoxides in admixture with monoepoxides. The epoxy esters of this invention are derivatives of the diepoxide component, and have the following formula:

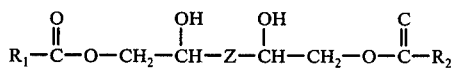

where $R_1$ is the residue of a fatty acid containing conjugated unsaturation, $R_2$ is the residue of a fatty acid containing nonterminal nonconjugated unsaturation, and Z is the residue of an organic diepoxide. The fatty acid would normally contain from 8–22 carbon atoms, preferably from 10–18 carbon atoms in the molecule. It will be understood that mixtures are formed which include the species shown by formula. Some or all of the hydroxy groups may also be esterified with the fatty acids, though this is not shown in the formula.

When the epoxy esters described above are copolymerized in water miscible organic solvent solution with monoethylenically unsaturated monomers having terminal unsaturation and which may include hydroxy-functional as well as carboxyl-functional monomers, a copolymer is formed in which much of the nonconjugated unsaturation in the epoxy ester is retained in a copolymer containing carboxyl groups and which may also contain primary primary hydroxyl groups. The acidic unsaturated resinous copolymers so-obtained are nongelled and organic solvent soluble, and even after precondensation with the phenolic resin, can be dispersed in water with the aid of a base and water miscible organic solvent.

The oxidative cure with atmospheric oxygen is assisted by the presence of driers, and driers, such as cobalt naphthenate, zirconium naphthenate, calcium naphthenate, or similar drier metal fatty acid salt, may be used in an amount of about 0.3 to about 2% of the weight of the copolymer, but these are not needed.

The preferred starting materials are resinous polyepoxides. Bisphenol-based diepoxides are particularly preferred. The average molecular weight of these can range from about 350 to about 4000 and the epoxy functionality is preferably in the range of 1.4–2.0, most preferably 1.8–2.0. Higher functional polyepoxides are also useful, but care must be taken to limit the proportion of conjugated unsaturation to avoid gelation during copolymerization or subsequent precondensation with the phenolic resin. These molecular weights are obtained by calculating from the epoxide equivalent weight.

It is particularly preferred to employ a diglycidyl ether of bisphenol A having an average molecular weight of about 800 to about 3000, and a diglycidyl ether of bisphenol A having an epoxide equivalent weight of about 900 and an average molecular weight of about 1800 will be used as illustrative.

As previously indicated, the starting diepoxide is reacted with two different types of fatty acids. First, and to enable copolymerization with the terminal unsaturation in the monoethylenically unsaturated monomer, reliance is had upon a fatty acid including conjugated unsaturation. These fatty acids will be illustrated herein by conjugated 9-11 castor fatty acids which are a commercially available mixture of fatty acids which contain conjugated unsaturation at the 9 and 11 positions. Eleostearic acid, found in tung oil, and licanic acid, found in oiticica oil, will further illustrate the conjugated fatty acids which are contemplated.

As will be appreciated, conjugated unsaturation is very reactive, and monoethylenic monomers containing the $CH_2=C<$ group (terminal unsaturation) will copolymerize in organic solvent solution with the conjugated unsaturation while leaving the bulk of any nonterminal nonconjugated unsaturation undisturbed.

It is desired that the copolymerization leave the epoxy ester in nongelled organic solvent-soluble condition, and this means that the number of conjugated groups per molecule must be limited to avoid cross-linking which causes premature gelation. For this reason, the conjugated fatty acid is used in an amount to provide from about 0.2 (preferably at least 0.5) to about 2.0 moles thereof per epoxy equivalent in the polyepoxide. Preferred proportions are from about 0.8 to about 1.5 mole of conjugated fatty acid per epoxy equivalent in the polyepoxide.

Substantially the entire balance of the epoxy functionality is consumed by reaction with the nonterminal nonconjugated unsaturated fatty acid. However, one can elect to waste a portion of the epoxy groups by esterification with a saturated fatty acid (lauric or myristic acids may be used) or by etherification with a saturated alcohol (lauryl alcohol is illustrative) and this can be done so long as there is employed at least about 0.5 mole (preferably at least about 0.8 mole) of nonterminal nonconjugated unsaturated fatty acid per mole of polyepoxide to provide enough residual unsaturation in the final copolymer to enable a reasonable oxidative cure to take place.

Fatty acids containing nonterminal nonconjugated ethylenic unsaturation are well known and will be illustrated herein by tall oil fatty acids. Other useful acids are oleic acid, linoleic acid, linolenic acid, and erucic acid.

Typical proportions are illustrated by the use of a diepoxide reacted with two molar proportions of conjugated fatty acid and two molar proportions of nonterminal nonconjugated unsaturated fatty acid, with not more than 50% molar excess of either type of fatty acid over the other. All of the epoxy groups are esterified and preferably, at least some of the hydroxyl groups are esterified. The acid number of the epoxy ester product should be below 40, preferably below 20 to minimize the proportion of free fatty acid.

The reaction of the polyepoxide with the fatty acid is a conventional reaction which is assisted by the presence of a small amount of basic catalyst. The formation of epoxy esters and the production of soluble copolymers therefrom is shown in U.S. Pat. No. 2,877,195.

The monoethylenically unsaturated monomers will constitute from about 15% to about 150%, preferably from 50% to 90%, based on the weight of the epoxy ester. These monomers contain terminal unsaturation as previously indicated, and are desirably constituted by a mixture of carboxyl-functional monomer, optionally monomer having a primary hydroxyl group, and nonreactive monomer. As is common knowledge, a non-reactive monomer does not react under the contemplated conditions of polymerization and cure. This usually means that the single ethylenic group is the only functional group in the copolymer.

The carboxyl-functional monomers must be selected for solubility and capacity for copolymerization. Suitable acids are acrylic acid, methacrylic acid, fumaric acid and maleic acid. The number of carboxyl groups is not important, but one, as in acrylic acid, is preferred. Enough acid should be used to enable dispersion in water after neutralization, and this requires from about 3% to about 20% of the carboxyl-functional monomers based on the weight of the copolymer. In preferred practice one would use from 5% to 12% of the carboxyl-functional monomers based on the weight of the copolymer.

The monomer providing the primary hydroxyl group is illustrated by hydroxy ethyl acrylate or methacrylate or allyl alcohol which provide primary hydroxy groups for cure with the aminoplast resin. From about 1% to about 15%, preferably from 2% to 8%, of the weight of the copolymer should be constituted by the hydroxyl monomer. It should be noted that the epoxy ester itself possesses hydroxy groups, but these are secondary hydroxy groups which do not provide the lowest curing temperature.

The nonreactive monomers are best illustrated by styrene, but vinyl toluene may be used in its place. Less desirably, one can use methyl methacrylate, acrylonitrile, vinyl acetate, ethyl acrylate, butyl acrylate, or the like, alone or in admixture with one another. Styrene or vinyl toluene will preferably constitute the entirety of the nonreactive monomers since this provides a clear homogeneous copolymer which is hard to obtain when other nonreactive monomers are used.

The solution copolymerization is itself entirely conventional, the reaction taking place in the solvent medium using heat and a free radical polymerization catalyst, normally a blend of peroxides, such as ditertiary butyl peroxide and cumene hydroperoxide. The solution polymerization does not consume all of the unsaturation, and it is preferred to have a residual iodine value in the copolymer of at least about 40.

The solvents used should be minimized and selected for miscibility with water in the amounts used when water application is contemplated. Ether alcohols, such as 2-butoxy ethanol, exhibit good water miscibility, and ketones, such as methyl ethyl ketone, are also quite good. However, solvents with limited miscibility in water are also helpful, such as small amounts of butanol. The class of organic solvents which may be present when acidic resins are dispersed in water with the aid of a base is well known, and is not a feature of this invention, but alcoholic solvents are preferred.

The solution copolymers in this invention are then precondensed with a phenolic resin which may be water soluble, water dispersible or oil soluble even where water application is desired. This is because when the copolymer and the phenolic resin are chemically combined, the acid content of the copolymer can drag a water insoluble phenolic resin into colloidal dispersion in water. Also, the phenolic resin may be heat hardening or nonheat-hardening since both are useful to improve salt spray and detergent resistance. However, the heat-hardening phenolic resins are best since these maximize the lowering of cure temperature. From 5-40% of the phenolic resin is used, preferably from 10-35%, based on the weight of the copolymer.

As will be understood, a phenolic resin in a condensate of phenol or a substituted phenol (like p-butyl phenol or p-phenyl phenol) with formaldehyde. If these were introduced as a separate curing reactant, they would introduce color problems and raise the curing temperature, problems which are minimized by precondensation. The phenolic resins are typified by simple condensates of phenol with formaldehyde, excess formaldehyde providing the heat-hardening characteristic. When the condensation is in alkaline medium we get the water soluble or water dispersible type known as an "A" stage resol. Any nongelled phenolic may be used herein and the Examples which follow will use commercially available phenolics of diverse type.

The precondensation between the phenolic resin and the hydroxy functional acidic copolymer is carried out easily by simply cooking the two together while replacing water of condensation.

The base used to neutralize the copolymer acidity is subject to wide variation, even sodium hydroxide being useful. Volatile nitrogenous bases are preferred, these being well known for the purposes of solubilizing acidic resins to provide aqueous coatings. Amines or ammonia are particularly useful, tertiary amines being best. This invention will be illustrated using dimethyl ethanol amine, but selection of the base is not a feature of this invention.

Neutralization of the copolymer acidity may be partial or complete as needed for dispersion in water. Complete (100%) neutralization is preferred herein, but normally 50–100% neutralization is adequate.

The initial solvent solution of neutralized resin is thinned with water until the water predominates. The final resin solids content can range from about 20% up, depending upon the coating thickness which is desired and the viscosity which can be tolerated for application. Flow coating constitutes a preferred application technique in this invention, but the invention is not so limited. Typical coatings are applied at 30–60% resin solids, and these can be pigmented or not as desired. Corrosion-resisting pigments, such as the conventional chromate pigments like strontium chromate and lead chromate may be used. For electrocoating, a resin solids content in the range of 2–20%, preferably 5–15% is employed.

An aminoplast may also be used, but this is not preferred. Typical aminoplast resins, all of which are formaldehyde condensates, are urea-formaldehyde, hexamethoxy methyl malamine and water dispersible transethers thereof with ethanol or other lower alcohol, benzoguanamine-formaldehyde and the like, including acidic derivatives.

The invention is illustrated in the following examples. All parts herein are by weight unless otherwise specified.

EXAMPLE 1

| Charge Composition (grams) | |
|---|---|
| 820 | Diglycidyl ether of bisphenol A having an epoxide equivalent weight of 900 |
| 310 | Conjugated 9–11 castor fatty acids |
| 310 | Tall oil fatty acids |
| | Set Dean-Stark trap with xylol. Heat to 150° C. to melt. Then add the following: |
| 60 | Xylol |
| 3 | Triethyl amine |
| | Heat to 225° C. and hold for an acid value of 15–17. Cool to 125° C. and add the following solvent: |
| 1200 | 2-Butoxy ethanol |
| | Premix the following monomers and catalysts and add over 3 hours at 120–125° C. |
| 900 | Styrene |
| 170 | Acrylic Acid |
| 60 | Hydroxy ethyl acrylate |
| 15 | Ditertiary butyl peroxide |
| 45 | Cumene-hydro-peroxide |
| 20 | Tertiary butyl mercaptan |
| 350 | 2-Butoxy ethanol |
| | Hold for 1 hour at 120° C. |
| 10 | Cumene-hydro-peroxide - add and hold for 1 hour. |
| 10 | Cumene-hydro-peroxide - add and hold for 2 hours. |
| | Add the following solvent and phenolic resin: |
| 560 | 2-Butoxy ethanol |
| 640 | Phenolic Resin - nonheat reactive (See Note 1) |
| | Hold 2 hours at 120° C. for condensation. |

EXAMPLE 2

| Charge Composition (grams) | |
|---|---|
| 820 | Diglycidyl ether of bisphenol A having an epoxide equivalent weight of 900 |
| 310 | Conjugated 9–11 castor fatty acids |
| 310 | Tall oil fatty acids |
| | Set Dean-Stark trap with xylol. Heat to 150° C. to melt. Then add the following: |
| 60 | Xylol |
| 3 | Triethyl amine |
| | Heat to 225° C. and hold for an acid value of 15–17. Cool to 125° C. and add the following solvent: |
| 1200 | 2-Butoxy ethanol |
| | Premix the following monomers and catalysts and add over 3 hours at 120–125° C. |
| 900 | Styrene |
| 170 | Acrylic acid |
| 60 | Hydroxy ethyl acrylate |
| 15 | Ditertiary butyl peroxide |
| 45 | Cumene-hydro-peroxide |
| 20 | Tertiary butyl mercaptan |
| 350 | 2-Butoxy ethanol |
| | Hold for 1 hour at 120° C. |
| 10 | Cumene-hydro-peroxide - add and hold for 1 hour. |
| 10 | Cumene-hydro-peroxide - add and hold for 2 hours. |
| | Add the following solvent and phenolic resin: |
| 560 | 2-Butoxy ethanol |
| 640 | Phenolic Resin - heat reactive (See Note 2) |
| | Hold 2 hours at 120° C for condensation |

Note 1 — The nonheat-reactive phenolic resin is provided by heat reacting paratertiary butyl phenol with formaldehyde in water containing a small proportion of methanol (provided by using 37% Formalin). The formaldehyde to phenol mol ratio is 1:1 and the reaction is carried at 60% solids in the presence of an acid catalyst (para-toluene sulfonic acid at 0.15% based on the phenol). The reaction is carried out at 200° F. for 3 hours to produce a water dispersion. The product is reduced with 2-butoxy ethanol and the water is removed to provide a solution of 60% solids content in 2-butoxy ethanol. The commercial product CKM 2400 supplied by Union Carbide Corporation is preferred.

Note 2 — The nonheat-reactive phenolic resin is provided by heat reacting paratertiary butyl phenol with formaldehyde in water containing a small proportion of methanol (provided by using 37% Formalin). The formaldehyde to phenol mol ration is 2:1 and the reaction is carried at 60% solids in the presence of an alkaline catalyst (sodium hydroxide at 1.0% based on the phenol). The reaction is carried out at 175° F. for 5 hours to produce a water dispersion. The commercial product CKM 1636 supplied by Union Carbide Corporation is preferred.

With respect to the two examples presented hereinbefore, Example 2 which employs a heat reactive phenolic resin illustrates preferred practice. The solution products of Examples 1 and 2 are dispersed in water by adding sufficient dimethyl ethanol amine to neutralize 100% of the acidity. Water solutions are prepared at 40% solids and coated on zinc phosphate treated steel panels. The coatings were applied using a No. 36 wire wound rod to provide coatings having a thickness of 0.6 mil. The coated panels were baked 20 minutes at 250° F. to provide very hard and flexible coatings. Specifically, the coatings had a pencil hardness of from 4H–5H and these exceptionally hard coatings were extremely flexible as evidenced by passing 60 inch/pounds of reverse impact. The coatings also possessed good detergent and salt spray resistance. Specifically, the panels passed 100 hours of immersion in a 1% detergent solution (the commercial product Tide was used) and no blistering was observed. The coated panels also passed 500 hours of exposure to a 5% salt spray solution. The Example 1 product gave corresponding results, but the use of a nonheat-reactive phenolic resin made it necessary to employ a somewhat higher baking temperature (20 minutes at 275° F.).

In addition to the low temperature cure and superior salt spray and detergent resistance, the phenolic condensates exhibit better wetting of contaminated metal surfaces which may contain oil or grease on the surface which is coated, and the coatings are less sensitive to the metal pretreatment. Thus, there is less crawling and pinholing.

Also, and when monoethylenic dicarboxylic acids are used in the foregoing Examples, such as fumaric acid, then water dispersibility is obtained with less than 10%, preferably less than 8% of reactive monomer, so these are of special value in satisfying FDA requirements.

The invention is defined in the claims which follow. We claim:

1. A low temperature curing epoxy ester copolymer-phenolic condensate comprising an epoxy ester of a resinous polyepoxide having an epoxy functionality in the range of from 1.4 to about 2.0 with at least about 0.2 moles of ethylenically unsaturated monocarboxylic acid containing conjugated ethylenic unsaturation per epoxy equivalent in the polyepoxide, and at least about 0.5 mole of ethylenically unsaturated monocarboxylic fatty acid containing nonterminal nonconjugated ethylenic unsaturation per epoxy equivalent in the polyepoxide, said epoxy ester being substantially free of epoxy functionality and being copolymerized in organic solvent solution with from about 15% to about 150%, based on the weight of the epoxy ester, of monoethylenically unsaturated monomers containing terminal ethylenic unsaturation to form a nongelled, solvent-soluble, copolymer possessing residual ethylenic unsaturation adapting the same for an oxidative cure, said monomers including from about 3% to about 20%, based on the weight of the copolymer, of carboxy-functional monomers selected from acrylic acid, methacrylic acid, fumaric acid and maleic acid, and said copolymer being precondensed with from 5% to 40% of a phenolic resin, based on the weight of the copolymer.

2. A low temperature curing epoxy ester copolymer-phenolic condensate as recited in claim 1 in which said carboxy-functional monomers are present in an amount of from 5% to 12% of the weight of the copolymer and the balance of the monomers consist of styrene and vinyl toluene.

3. A low temperature curing epoxy ester copolymer-phenolic condensate as recited in claim 2 in which said polyepoxide is a diglycidyl ether of bisphenol A having an average molecular weight of about 800 to about 3000 and an epoxy functionality in the range of 1.8 to 2.0.

4. A low temperature curing epoxy ester copolymer-phenolic condensate as recited in claim 2 in which the acidity of said copolymer is at least partially neutralized with a volatile base to render said copolymer stably dispersible in water.

5. The low temperature curing epoxy ester copolymer-phenolic condensate of claim 2 dispersed in water with the aid of a volatile base and water miscible organic solvent.

6. A low temperature curing epoxy ester copolymer-phenolic condensate as recited in claim 1 in which said monocarboxylic fatty acids contain from 8–22 carbon atoms.

7. A low temperature curing epoxy ester copolymer-phenolic condensate as recited in claim 1 in which said monomers further include monomer providing the primary hydroxy group in an amount of from about 1% to about 15% of the weight of the copolymer.

8. A low temperature curing epoxy ester copolymer-phenolic condensate as recited in claim 7 in which said epoxy ester contains less than 2.0 moles of said conjugated fatty acid per epoxy equivalent in said polyepoxide.

9. A low temperature curing epoxy ester copolymer-phenolic condensate as recited in claim 8 in which said epoxy ester contains from about 0.8 to about 1.5 moles of said conjugated fatty acid per epoxy equivalent in said polyepoxide.

10. A low temperature curing epoxy ester copolymer-phenolic condensate as recited in claim 9 in which said monoethylenically unsaturated monomers are used in an amount of from 50% to 90%, based on the weight of the epoxy ester.

11. A low temperature curing epoxy ester copolymer-phenolic condensate as recited in claim 7 in which said monoethylenically unsaturated monomers are used in an amount of from 50% to 90% based on the weight of the epoxy ester, and said hydroxy monomer is present in an amount of from 2% to 8% of the weight of the copolymer.

12. A low temperature curing epoxy ester copolymer-phenolic condensate as recited in claim 11 in which said carboxyl-functional monomers are present in an amount of from 5% to 12% of the weight of the copolymer.

13. A low temperature curing epoxy ester copolymer-phenolic condensate as recited in claim 12 in which the acidity of said copolymer is at least partially neutralized with a volatile base to render said copolymer stably dispersible in water.

14. A low temperature curing epoxy ester copolymer-phenolic condensate as recited in claim 12 in which said phenolic resin is a nonheat reactive phenolic resin.

15. A low temperature curing epoxy ester copolymer-phenolic condensate as recited in claim 14 in which said hydroxy monomer is hydroxy ethyl acrylate.

16. The low temperature curing epoxy ester copolymer-phenolic condensate of claim 14 dispersed in water with the aid of a volatile base and water miscible organic solvent.

17. A low temperature curing epoxy ester copolymer-phenolic condensate as recited in claim 1 in which said copolymer has an iodine value of at least about 40.

18. A low temperature curing epoxy ester copolymer-phenolic condensate as recited in claim 17 in which said monocarboxylic fatty acids contain from 10–18 carbon atoms.

19. A low temperature curing epoxy ester copolymer-phenolic condensate as recited in claim 1 in which said phenolic resin is a heat reactive phenolic resin.

* * * * *